United States Patent
Basham et al.

(10) Patent No.: US 10,303,573 B2
(45) Date of Patent: *May 28, 2019

(54) SCALING OUT A HYBRID CLOUD STORAGE SERVICE

(71) Applicant: International Business Machines Corporation, Armonk, NY (US)

(72) Inventors: Robert B. Basham, Beaverton, OR (US); John Lewars, New Paltz, NY (US); Christopher J. Tan, Austin, TX (US); Oleksandr Safonov, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,390

(22) Filed: Jun. 19, 2017

(65) Prior Publication Data

US 2018/0365116 A1    Dec. 20, 2018

(51) Int. Cl.
*G06F 11/00* (2006.01)
*G06F 11/20* (2006.01)

(52) U.S. Cl.
CPC .... *G06F 11/2094* (2013.01); *G06F 2201/805* (2013.01); *G06F 2201/82* (2013.01)

(58) Field of Classification Search
CPC .................................................. G06F 11/2094
See application file for complete search history.

(56) References Cited

U.S. PATENT DOCUMENTS

| 7,178,059 B2 * | 2/2007 | Greenspan | H04L 29/06 714/10 |
| 8,977,886 B2 | 3/2015 | Bauer et al. | |
| 9,424,152 B1 | 8/2016 | Raut et al. | |
| 9,477,555 B1 * | 10/2016 | Hagan | G06F 11/1464 |
| 9,866,493 B2 * | 1/2018 | Deore | H04L 47/32 |
| 9,898,359 B2 * | 2/2018 | Angeles | G06F 11/079 |
| 2004/0240097 A1 * | 12/2004 | Evans | G11B 15/689 360/69 |

(Continued)

FOREIGN PATENT DOCUMENTS

CN    102629224 B    11/2014

OTHER PUBLICATIONS

Chang, Victor, "Towards a Big Data System Disaster Recovery in a Private Cloud", School of Computing, Creative Technologies and Engineering, Leeds Beckett University, Leeds, UK, Accepted by Ad Hoc Networks, printed on May 1, 2017, 21 pages.

(Continued)

*Primary Examiner* — Christopher S McCarthy
(74) *Attorney, Agent, or Firm* — Issac J. Gooshaw

(57) ABSTRACT

Software and resources, pre-deployed in accordance with a disaster recovery policy, are placed in a standby state to provide rapid disaster recovery in a cloud storage environment. When a disaster recovery situation is detected, (for example a loss of access to primary data), the pre-deployed resources are immediately activated according to the disaster recovery policy to provision and re-configure adequate resources and rapidly restore access to the data (such as restoring data from cloud backup storage). A disaster recovery situation may involve, for example, loss of hardware availability, network bandwidth interruption, or a sudden and large unforeseen jump in storage retrieval request volume (for example a recall storm).

17 Claims, 4 Drawing Sheets

(56) References Cited

U.S. PATENT DOCUMENTS

| | | | | |
|---|---|---|---|---|
| 2008/0250214 A1* | 10/2008 | Brettell | ............... | G06F 11/1441 |
| | | | | 711/162 |
| 2010/0228819 A1 | 9/2010 | Wei | | |
| 2011/0022879 A1* | 1/2011 | Chavda | ............... | G06F 11/0793 |
| | | | | 714/1 |
| 2014/0297865 A1* | 10/2014 | Deore | ................... | H04L 47/788 |
| | | | | 709/226 |
| 2016/0323377 A1 | 11/2016 | Einkauf et al. | | |
| 2017/0139791 A1* | 5/2017 | Hagan | ................. | G06F 11/2069 |
| 2017/0193003 A1* | 7/2017 | Vijayan | ............... | G06F 11/1662 |
| 2017/0206219 A1* | 7/2017 | Vijayan | ............. | G06F 17/30156 |
| 2017/0269859 A1* | 9/2017 | Xu | ......................... | G06F 3/0619 |
| 2017/0308421 A1* | 10/2017 | Angeles | ................ | G06F 11/079 |
| 2018/0067827 A1* | 3/2018 | Gallagher | ........... | G06F 11/2097 |
| 2018/0107534 A1* | 4/2018 | Angeles | .............. | G06F 11/0793 |

OTHER PUBLICATIONS

Khoshkholghi et al., "Cluster as a Service for Disaster Recovery in Intercloud Systems: Design and Modeling", International Journal of Cloud Computing and Services Science (IJ-CLOSER), vol. 3, No. 3, Jun. 2014, pp. 163-171 ISSN: 2089-3337.

Lu et al., "Incorporating Uncertainty into in-Cloud Application Deployment Decisions for Availability", 2013 IEEE Sixth International Conference on Cloud Computing (CLOUD), IEEE, 8 pages.

Basham et al., "Scaling Out a Hybrid Cloud Storage Service", U.S. Appl. No. 15/889,300, filed Feb. 6, 2018, 18 pages.

IBM Appendix P., "List of IBM Patents or Patent Applications to be Treated as Related", Dated Feb. 6, 2018, 2 pages.

* cited by examiner

SCALING OUT A HYBRID CLOUD STORAGE SERVICE

BACKGROUND OF THE INVENTION

The present invention relates generally to the field of cloud storage, and more specifically to disaster recovery solutions in a cloud environment.

A cloud computing environment provides shared computer processing resources on demand, including data storage and backup. In some scenarios, an enterprise employs cloud storage backup to protect critical on-site data. In case some of the on-site data becomes inaccessible, for example due to a hardware or networking problem, the enterprise can recover the data from the cloud backup.

Some data storage systems, including cloud storage systems implement a storage tiering strategy, whereby data that is accessed frequently is placed on a fast storage tier, such as solid state drives, while data that is accessed less frequently is placed on a slower storage tier such as hard drives, optical drives, and/or tape drives.

SUMMARY

According to an aspect of the present invention, there is a method, computer program product and/or system that performs the following operations (not necessarily in the following order): receiving a disaster recovery policy with respect to a first storage system; pre-deploying resources according to the disaster recovery policy, to provide pre-deployed resources; receiving information indicative of a disaster recovery situation with respect to a first set of data stored on the first storage system; and activating the pre-deployed resources according to the disaster recovery policy.

DETAILED DESCRIPTION

Some embodiments of the present invention pre-define policies for handling disaster recovery (DR) situations in a cloud storage environment. Software and resources are pre-deployed and standing by. When a DR situation is detected, for example causing a loss of access to primary data (the protected data), the pre-deployed resources are immediately activated to provision and re-configure adequate resources to rapidly restore access to the data, (such as restoring the protected data from cloud backup storage) in an optimum fashion. A DR situation can involve loss of hardware availability, network bandwidth interruption (disaster), or a sudden and large unforeseen jump in storage retrieval request volume (recall storm).

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

Figure 1:
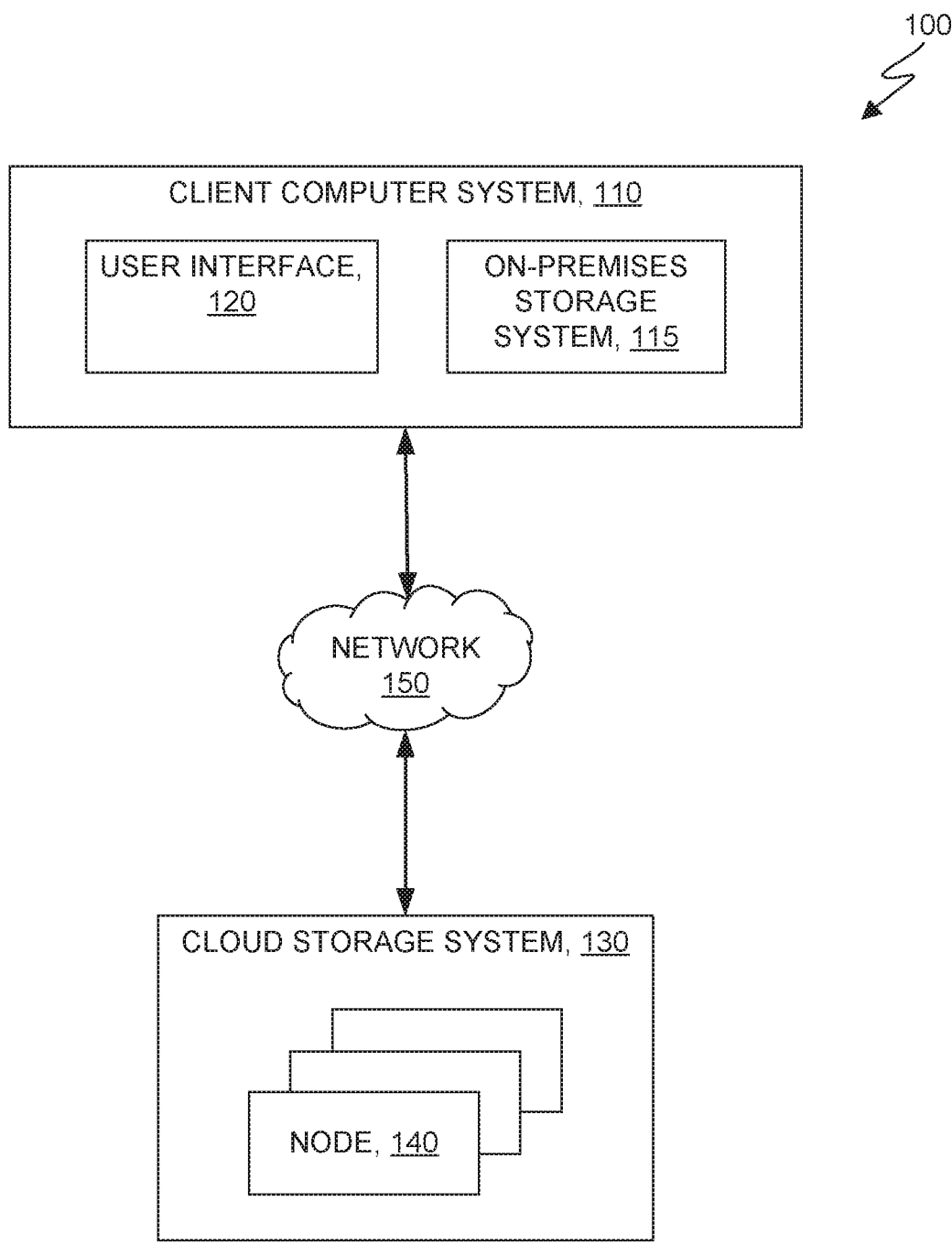
FIG. 1 is a functional block diagram depicting a computing environment in accordance with at least one embodiment of the present invention.

FIG. 1 is a functional block diagram depicting a computing environment 100 in accordance with an embodiment of the present invention. Computing environment 100 includes: client computer system 110; user interface 120; cloud storage system 130, storage tier 140; and network 150. Client computer system 110 can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail with regard to FIG. 4.

II. EXAMPLE EMBODIMENT

Figure 2:
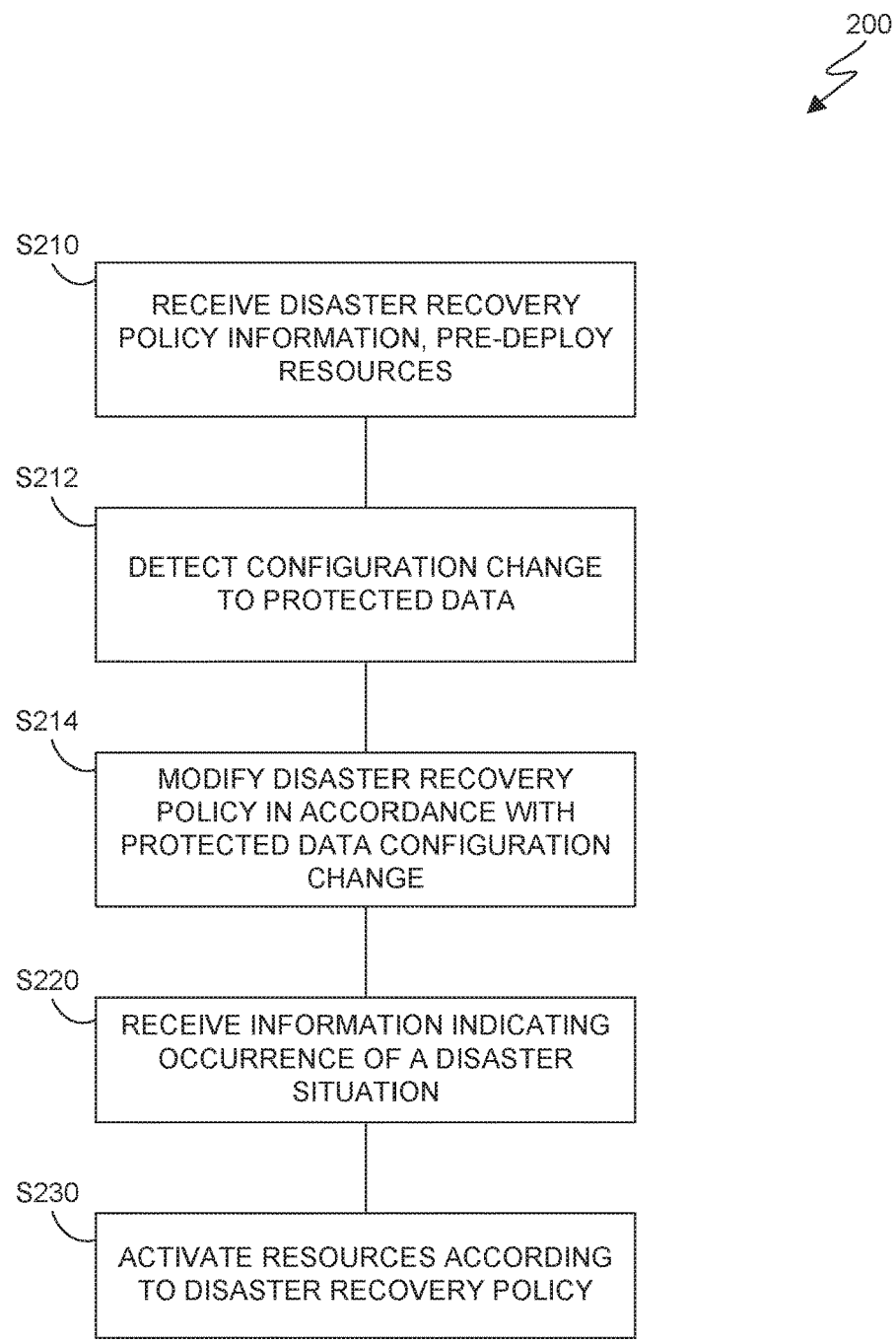
FIG. 2 is a disaster handling method in accordance with at least one embodiment of the present invention.
Figure 3:
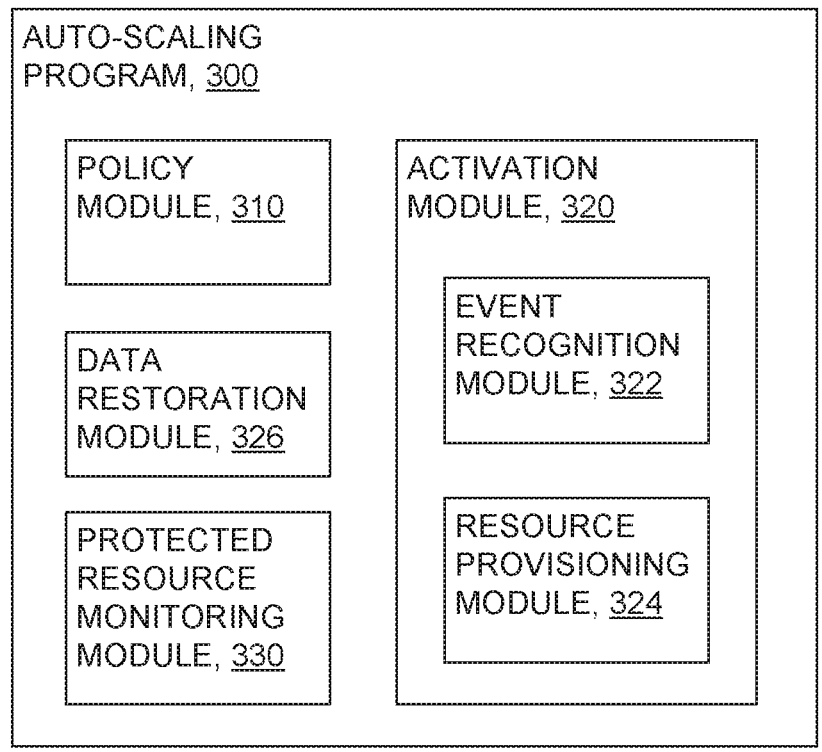
FIG. 3 is a block diagram showing a machine logic (for example, software) portion of at least one embodiment of the present invention.

FIG. 2 shows flowchart 200 depicting a method according to the present invention. FIG. 3 shows auto-scaling program 300 for performing at least some of the method operations of flowchart 200. This method and associated software will now be discussed, over the course of the following paragraphs, with extensive reference to FIG. 2 (for the method operation blocks) and FIG. 3 (for the software blocks).

Processing begins at operation S210, where policy module 310 of auto-scaling program 300 receives and stores disaster recovery policy information. In some embodiments of the present invention, the disaster recovery policy information is input by a user (for example, a storage system administrator, not shown in the Figures). Alternatively, the policy information may be a pre-defined set of storage system defaults, or a combination of system defaults and user input.

The disaster recovery policy includes information that identifies a set of nodes in an existing cluster that are available to be used by a gateway in a "disaster recovery mode". Similarly, a set of nodes is identified that are available to be used in a "recall storm mode". In some embodiments of the present invention, these nodes have the storage tiering service pre-installed on them so that bring-up can be immediate with very little overhead. Moreover, in some embodiments of the present invention, if cloud services are available, the disaster recovery policy identifies a number of nodes that can be provisioned dynamically on the cloud such that the nodes are provided on demand when needed.

Processing proceeds at operation S212 where protected resource monitoring module 330, of auto-scaling program 300, detects a change in the configuration of the protected data. A configuration change may encompass changes to: (i) the size (data capacity) of the protected data; (ii) the tiering structure of the protected data; (iii) the physical location(s) of the data; (iv) the redundancy of the data, etc., to name a few examples.

Processing proceeds at operation S214 where in response to detecting (in operation S212 above) the protected resource configuration change, policy module 310 of auto-scaling program 300 automatically modifies the disaster recovery policy in accordance with the configuration change. For example, if the protected data doubles in size from 100 TB to 200 TB, the resources specified in the DR policy to provide the necessary bandwidth may double. If on the other hand the protected data are split up and distributed between two data centers, the DR policy is modified to remain current with that configuration change.

Processing proceeds at operation S220, where event recognition module 322, of activation module 320, receives input indicating that a disaster recovery (DR) situation has developed. The DR situation in general is defined, in some embodiments of the present invention, as any event that requires rapid restoration of a large volume of data from one system to another (such as from a cloud backup storage system to an on-premises storage system) that is sudden, unforeseen, and/or unusual in magnitude.

Processing proceeds at operation S230, where resource provisioning module 324, of activation module 320, dynamically provisions resources that were pre-installed in operation S210 above. In the case of on-premises pre-installed deployment, the resources are all added to existing node groups so that the cloud storage tiering or sharing service has the resources at hand to address the DR or RS situation. In some embodiments of the present invention, the resources are provisioned according to the disaster recovery policy plan set up in operation S210 above. Once the provisioning is completed, the resources are assigned to existing node groups.

Processing proceeds at operation S240, where data restoration module 326 of auto-scaling program 300, immediately starts appropriate scaling of resources available for the tiering or sharing service and initiates data recall, for example, from cloud storage system 130 to on-premises storage system 115 (see FIG. 1)

III. FURTHER COMMENTS AND/OR EMBODIMENTS

The need for resources of a cloud tiering or sharing service, such as a transparent cloud tiering service (which provides a native cloud storage tier, allowing data center administrators to free up on-premises storage capacity, by moving out cooler data to the cloud storage), can vary greatly. For example, in the course of normal activities a relatively small number of nodes can service routine migration and recall needs for a cool or cold storage tier. However, in unusual situations, such as for disaster recovery wherein very large amounts of data need to be moved in a short period of time, the service needs far larger amounts of resources. Conventional auto-scaling techniques do not necessarily cover unusual cases effectively, as these techniques tend to be reactive and metrics oriented.

Some embodiments of the present invention may include one, or more, of the following features, characteristics and/or advantages in a critical situation such as a disaster recovery or massive data recall situation: (i) solution may be implemented immediately or even predictively; (ii) provides immediate or predictive resource scaling; (iii) solution allows for optimal usage of resources in a critical situation; and/or (iv) dynamically scales up cloud tiering or sharing services (such as transparent cloud tiering services) on demand. The core value proposition of this auto-scaling approach is to recognize that a disaster recovery situation is at hand and immediately start appropriate scaling of resources available for the tiering or sharing service.

In some embodiments of the present invention, initiation of auto-scaling is triggered by one or more of the following events: (i) a complete hardware failure, that for example, takes off-line volumes of data which in turn necessitates recovery of data from remote source(s) (an example of disaster recovery (DR) mode); (ii) bringing-up of a new cluster where initialization is done indicating that data will be recovered remotely (an example of DR recovery mode); (iii) manual input (for example by an administrator), or by a script that puts the system into DR recovery mode; and/or (iv) manual input (for example by an administrator), or by a script, that initiates a large recall request (recall storm mode).

Some embodiments of the present invention include a preparation phase and an activation phase, as will be discussed in the following few paragraphs.

Preparation Phase:

The storage administrator sets up a physical environment that will meet the demands of a disaster recovery scenario. Preparation includes (i) hardware planning; (ii) policy setup; (iii) installation; and/or (iv) dynamic provisioning. The demands of a disaster recovery scenario are dynamic. That is, the disaster recovery resources that need to be marshaled in a DR scenario may change in accordance with changes in the size and/or configuration of the storage resources (the protected data) that fall within the scope of the disaster recovery policy. As the size or configuration of the protected data changes, the DR resources specified in the DR policy are adjusted accordingly.

(i) Hardware Planning:

Hardware planning includes ensuring that sufficient network bandwidth and other resources such as load balancers are available to meet a required time window. The required time window, in some embodiments of the present invention, is a contractual agreement between a client and a supplier, in which the parties agree that a specified amount of data can be restored within a specified time limit. In some embodiments of the present invention, the required time window is a complex set of requirements, involving data quantities, access latencies to certain classes of data during a recovery period, etc. By way of a simple example, a client may identify three data categories (cat 1, cat 2 and cat 3) where: (i) 20% of cat 1 data would be required to be restored within 30 seconds of onset of a disaster scenario and the remaining 80% within 1 minute; (ii) cat 2 within 5 minutes; and (iii) cat 3 within 1 hour.

(ii) Setting Up Policy:

In some embodiments of the present invention, metadata is kept out on cloud storage. The storage administrator identifies and prioritizes which data is to be returned (in a DR or RS scenario) by setting up, in advance, a disaster recovery policy. The network bandwidth and other resources that are planned to meet a DR scenario may change as the size of the protected data changes over time. The DR policy is dynamically changed accordingly, such that it is properly configured to handle a DR scenario at any given time and for any given state (size, configuration, etc.) of the protected data. The DR policy can leverage any, or all of the metadata. The policy may specify that the hottest data (data with the most I/O activity) and critical data sets that have been pre-identified, are to be the first data recovered, followed by data that is less hot and not as critical. This allows the storage administrator to specify data restoration in an optimal order with respect to recovering from a potential disaster situation. In the case of a recall storm, similarly an administrator, by way of setting up the policy, prioritizes in advance of an extreme event, as to what data is to be recalled—and the order in which the data is to be recalled.

The policy may take into account the order in which the data is requested in real time at the time of the restoration process.

(iii) Installation:

The system administrator, upon installation, identifies a set of nodes in an existing cluster that are available to be used by the gateway for "DR mode" ("disaster recovery mode"). Similarly, a (possibly different) set of nodes is identified that are available to be used for "RS mode" ("recall storm mode"). These nodes can have the tiering service pre-installed on them so that bring-up is immediate with very little overhead.

(iv) Dynamic Provisioning:

Moreover, in some embodiments of the present invention, if cloud services are available, the administrator identifies a number of nodes that can be provisioned dynamically on the cloud for such use, such that the nodes are provided on demand when needed.

Activation Phase:

On Premises:

Once an event happens—for example a recall storm (RS) situation or a disaster recovery (DR) situation—embodiments immediately enable resources on the pre-installed nodes. In the case of on-premises pre-installed deployment, the resources automatically are all added to existing node groups so that the cloud storage tiering or sharing service has the resources at hand to address the DR situation.

With a Cloud Service:

Once an event, such as a recall storm (RS) situation or a disaster recovery (DR) situation occurs, the resources are automatically dynamically provisioned according to the plan (including the disaster recovery policy) set up by the storage administrator during the preparation phase. Once the provisioning is completed, the resources are assigned to existing node groups. The restore operations are performed in order of priority. In some embodiments, the name-space is the first thing that is restored so that the namespace is intact and storage service can begin. Thereafter, transparent recalls are given the highest priority such that data that is in need of immediate access is recalled first, then followed by additional data that is brought back in priority order according to the disaster recovery policy.

Scaling out a hybrid cloud storage service provides accelerated disaster recovery comprising: (i) pre-defining policies to cover extreme situations including disaster recovery; (ii) preinstalling necessary software to allow nodes to operate in different modes and to operate as part of different node groups during a range of normal conditions and in extreme conditions; (iii) defining which nodes will be used for the disaster recovery; (iv) pre-defining relationships of clusters with object storage in the cloud, so a normal cluster can be converted to, for example, a hyperfast disaster recovery system; (v) predefining associations and configurations on the remote cloud to enable repurposing in the event of a disaster; (vi) repurposing existing hardware into different node groups (including repurposing gateway nodes, object storage nodes and general compute nodes); (vii) predefining service tiering for extreme conditions such as disaster recovery; (viii) restoring data in the order of priority.

Some embodiments may not have these potential advantages and these potential advantages are not necessarily required of all embodiments.

Figure 4:
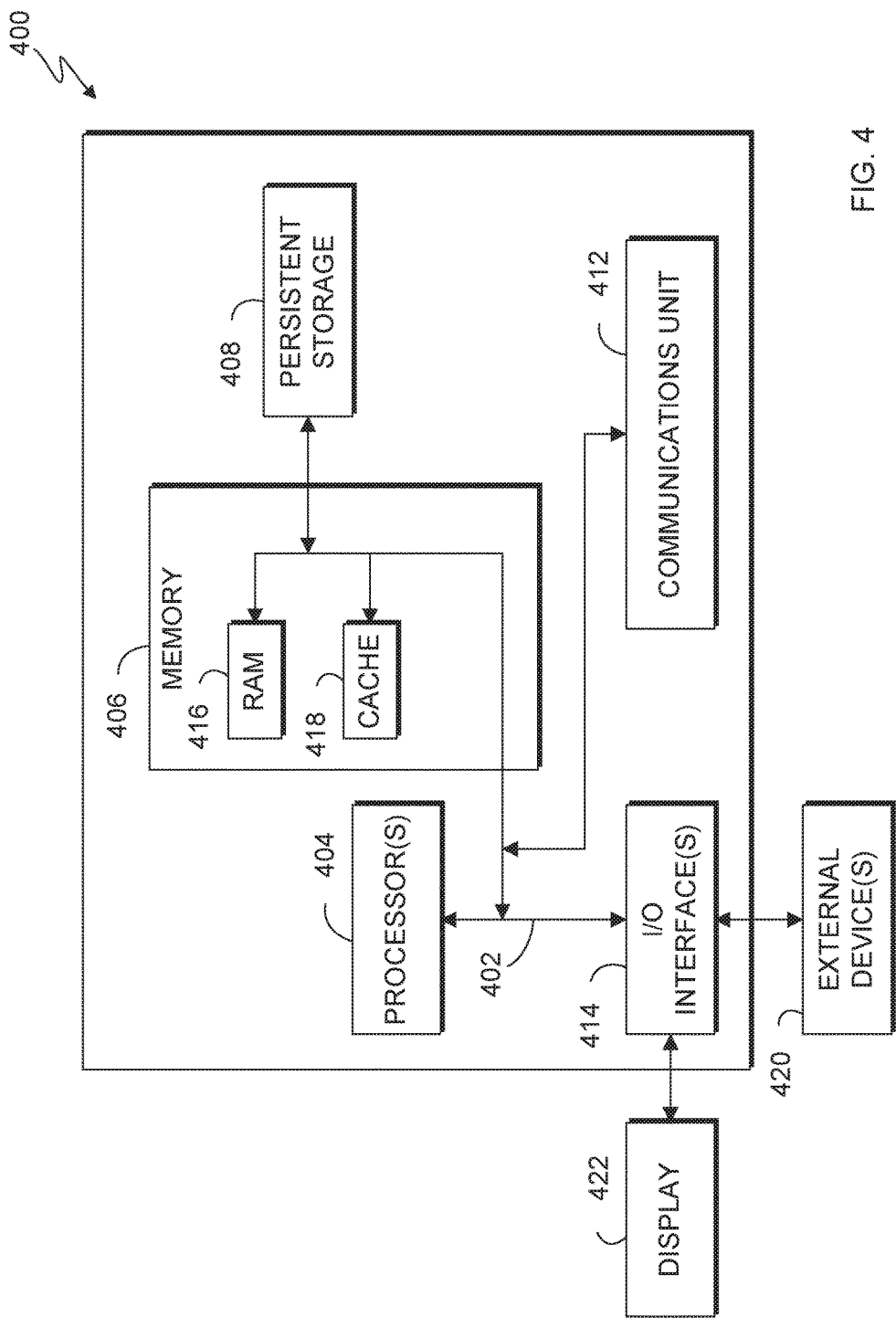
FIG. 4 is a block diagram depicting components of a computer, in accordance with at least one embodiment of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (110) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving a disaster recovery policy with respect to a first storage system, wherein the disaster recovery policy comprises the following information: (i) identification of a first set of nodes that are available to be used by a gateway in a disaster recovery mode; and (ii) identification of a second set of nodes that are available to be used in a recall storm mode;
   pre-deploying resources according to the disaster recovery policy, to provide pre-deployed resources;
   receiving information indicative of a disaster recovery situation with respect to a first set of data stored on the first storage system; and
   activating the pre-deployed resources according to the disaster recovery policy.

2. The method of claim 1, further comprising:
   monitoring the first storage system with respect to a configuration thereof;
   determining that the first storage system underwent a configuration change; and
   in response to determining that the first storage system underwent the configuration change, automatically adjusting the disaster recovery policy in accordance with the configuration change.

3. The method of claim 1, further comprising at least one of:
   pre-deploying the first set of nodes;
   pre-deploying the second set of nodes;
   pre-installing a storage tiering service on the first set of nodes; and
   pre-installing the storage tiering service on the second set of nodes.

4. The method of claim 3, wherein activating the pre-deployed resources according to the disaster recovery policy comprises:
   automatically adding the first set of nodes to at least one existing node group;
   automatically restoring a name-space with respect to the first storage system; and
   initiating restoration of the first set of data.

5. The method of claim 3, wherein activating the pre-deployed resources according to the disaster recovery policy comprises automatically adding the second set of nodes to at least one existing node group.

6. The method of claim 3, wherein the pre-deployed resources comprise:
   network bandwidth sufficient to meet a maximum data recovery time threshold;
   at least one load balancer sufficient to meet the maximum data recovery time threshold;
   a first storage tiering service installed on the first set of nodes; and
   a second storage tiering service installed on the second set of nodes.

7. A computer program product comprising:
one or more computer readable storage media and program instructions stored on the one or more computer readable storage media, the program instructions comprising instructions to perform:
receiving a disaster recovery policy with respect to a first storage system, wherein the disaster recovery policy comprises the following information: (i) identification of a first set of nodes that are available to be used by a gateway in a disaster recovery mode; and (ii) identification of a second set of nodes that are available to be used in a recall storm mode;
pre-deploying resources according to the disaster recovery policy, to provide pre-deployed resources;
receiving information indicative of a disaster recovery situation with respect to a first set of data stored on the first storage system; and
activating the pre-deployed resources according to the disaster recovery policy.

8. The computer program product of claim 7, further comprising program instructions to perform:
monitoring the first storage system with respect to a configuration thereof;
determining that the first storage system underwent a configuration change; and
in response to determining that the first storage system underwent the configuration change, automatically adjusting the disaster recovery policy in accordance with the configuration change.

9. The computer program product of claim 7, further comprising program instructions to perform at least one of:
pre-deploying the first set of nodes;
pre-deploying the second set of nodes;
pre-installing a storage tiering service on the first set of nodes; and
pre-installing the storage tiering service on the second set of nodes.

10. The computer program product of claim 9, wherein activating the pre-deployed resources according to the disaster recovery policy comprises program instructions to perform:
automatically adding the first set of nodes to at least one existing node group;
automatically restoring a name-space with respect to the first storage system; and
initiating restoration of the first set of data.

11. The computer program product of claim 9, wherein activating the pre-deployed resources according to the disaster recovery policy comprises program instructions to perform automatically adding the second set of nodes to at least one existing node group.

12. The computer program product of claim 9, wherein the pre-deployed resources comprise:
network bandwidth sufficient to meet a maximum data recovery time threshold;
at least one load balancer sufficient to meet the maximum data recovery time threshold;
a first storage tiering service installed on the first set of nodes; and
a second storage tiering service installed on the second set of nodes.

13. A computer system comprising:
one or more computer processors;
one or more computer-readable storage media;
program instructions stored on the computer-readable storage media for execution by at least one of the one or more processors, the program instructions comprising instructions to perform:
receiving a disaster recovery policy with respect to a first storage system, wherein the disaster recovery policy comprises the following information: (i) identification of a first set of nodes that are available to be used by a gateway in a disaster recovery mode; and (ii) identification of a second set of nodes that are available to be used in a recall storm mode;
pre-deploying resources according to the disaster recovery policy, to provide pre-deployed resources;
receiving information indicative of a disaster recovery situation with respect to a first set of data stored on the first storage system; and
activating the pre-deployed resources according to the disaster recovery policy.

14. The computer system of claim 13, further comprising program instruction to perform:
monitoring the first storage system with respect to a configuration thereof;
determining that the first storage system underwent a configuration change; and
in response to determining that the first storage system underwent the configuration change, automatically adjusting the disaster recovery policy in accordance with the configuration change.

15. The computer system of claim 13, further comprising program instructions to perform at least one of:
pre-deploying the first set of nodes;
pre-deploying the second set of nodes;
pre-installing a storage tiering service on the first set of nodes; and
pre-installing the storage tiering service on the second set of nodes.

16. The computer system of claim 15, wherein activating the pre-deployed resources according to the disaster recovery policy comprises program instructions to perform:
automatically adding the first set of nodes to at least one existing node group;
automatically restoring a name-space with respect to the first storage system; and
initiating restoration of the first set of data.

17. The computer system of claim 15, wherein activating the pre-deployed resources according to the disaster recovery policy comprises program instructions to perform automatically adding the second set of nodes to at least one existing node group.

* * * * *